(12) United States Patent
Ogawa et al.

(10) Patent No.: US 7,448,592 B2
(45) Date of Patent: Nov. 11, 2008

(54) POPPET VALVE DEVICE AND ELECTRONIC CONTROLLED FUEL INJECTION APPARATUS EQUIPPED WITH THE DEVICE

(75) Inventors: Hisao Ogawa, Sagamihara (JP); Takashi Kaneko, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/066,234

(22) Filed: Feb. 25, 2005

(65) Prior Publication Data

US 2005/0189511 A1 Sep. 1, 2005

(30) Foreign Application Priority Data

Feb. 27, 2004 (JP) ............... 2004-055202

(51) Int. Cl.
*F02M 51/00* (2006.01)
(52) U.S. Cl. ............... 251/129.16; 251/14; 251/129.15; 251/318; 123/90.11
(58) Field of Classification Search ............ 251/129.15, 251/129.16, 129.18, 129.19, 14, 318–321; 123/90.1, 90.11
See application file for complete search history.

(56) References Cited

U.S. PATENT DOCUMENTS

| | | | | | |
|---|---|---|---|---|---|
| 5,005,803 | A | * | 4/1991 | Fritz et al. ............. | 251/129.15 |
| 6,024,060 | A | * | 2/2000 | Buehrle et al. ........... | 123/90.12 |
| 2002/0141881 | A1 | * | 10/2002 | Okada et al. ............. | 417/222.2 |

FOREIGN PATENT DOCUMENTS

| | | | |
|---|---|---|---|
| DE | 37 41 526 A1 | | 6/1989 |
| EP | 0 816 672 A2 | | 1/1998 |
| EP | 1 162 365 A1 | | 12/2001 |
| JP | 1-42262 | * | 6/1989 |
| JP | 2-35965 | | 3/1990 |
| JP | 6-14464 | | 1/1994 |
| JP | 6-14464 | | 2/1994 |
| JP | 2000-186648 | * | 7/2000 |
| JP | 2001-20822 | * | 1/2001 |
| JP | 2001-173540 | | 6/2001 |
| JP | 2001-248479 | | 9/2001 |
| JP | 2002-98024 | | 4/2002 |

* cited by examiner

*Primary Examiner*—J. Casimer Jacyna
(74) *Attorney, Agent, or Firm*—Wenderoth, Lind & Ponack, L.L.P.

(57) ABSTRACT

A poppet valve device is composed such that a plurality of axial passages of substantially the same diameter and length communicating to a high-pressure space formed inside the valve seat member between the poppet valve body and the valve seat member are provided in the valve seat member. The passages are located adjacent to each other, or located axially symmetrically. An annular gap formed between the periphery of the poppet valve body and the inner perimeter of a projecting part on which the valve seat face of the valve seat member is formed is narrow to restrict liquid flow through the annular gap. An electronic controlled fuel injection apparatus equipped with the poppet valve device is composed such that a lower end part of the poppet valve body and the bottom of a valve device accommodating part of the fuel injection apparatus are formed to restrict the flow of fuel from between the lower end of the poppet valve body and the bottom of the valve device accommodation part to the central hollow of the poppet valve body, whereby the occurrence of bouncing is prevented.

5 Claims, 6 Drawing Sheets

POPPET VALVE DEVICE AND ELECTRONIC CONTROLLED FUEL INJECTION APPARATUS EQUIPPED WITH THE DEVICE

BACKGROUND OF THE INVENTION

1. Field of the Invention

The present invention relates to a poppet valve device for performing opening and closing of a high-pressure liquid passage, specifically to a poppet valve device to control the injection timing of an electronic controlled fuel injection apparatus for an internal combustion engine.

2. Description of the Related Art

In diesel engines, electronic controlled fuel injection apparatus have been widely used recently as an effective means for reducing atmospheric pollutants such as NOx (nitrogen oxides) and HC (hydrocarbons) (for example, see Japanese Laid-Open Patent Application Nos 2001-248479 and 2002-98024).

A poppet valve device driven by an electromagnetic valve device is used in each of these apparatuses for opening and closing the fuel passage in the apparatus.

FIG. 6 represents an example of a unit injector type electronic controlled fuel injection apparatus for a diesel engine. The unit injector like this is well known in the art and here brief explanation will be given. In the drawing, reference numeral 100 comprises a fuel injection pump part 101 and a fuel injection nozzle part 102. The fuel injection pump part 101 includes a poppet valve 5 and an electromagnetic valve device 20 for opening and closing the valve. A plunger 1 fitted into a pump case 3 is driven to reciprocate by way of a tappet 6, contact piece 7, plunger spring 8, etc. by means of a rocker arm 54 which is driven mechanically by the engine crank shaft to oscillate. A plunger chamber 25 is communicated to the injection nozzle part 102 via a fuel passage 052 on one side and communicated to the poppet valve 5 via a fuel passage 52 on the other side. The fuel passage 52 is communicated or discommunicated to a fuel passage 12 connecting to a fuel tank (not shown in the drawing) by opening or closing of the poppet valve 5, which is opened or closed by the electromagnetic valve device 20. The fuel injection nozzle part 102 includes a fuel injection nozzle 2 and a needle valve spring 51. The fuel pushed by a plunger 1 to be compressed in the plunger chamber 25 flows through the fuel passage 052 to a fuel pool 02 and is injected from the injection holes 02a.

When the poppet valve 5 is opened, the pressure in the plunger chamber 25 does not increase by a down stroke of the plunger 1 because the plunger chamber 25 is communicated to the fuel tank through the fuel passage 52, through the poppet valve, and through the fuel passage 12. When the poppet valve 5 is closed, the pressure in the plunger chamber 25 increases as the plunger 1 moves down, and when the pressure in the fuel pool 02 reaches the needle-opening pressure, the needle valve 4 lifts up, overcoming the spring force of the needle valve spring 51, and the fuel begins to be injected from the injection holes 02a. During the fuel injection period, the amount of fuel compressed by the plunger is larger than that injected from the injection holes 02a of the injection nozzle 2 and the injection pressure increases with time. When the poppet valve is opened to communicate the plunger chamber 25 to the fuel tank, the pressure in the plunger chamber decreases rapidly, the pressure in the fuel pool 02 decreases rapidly, the needle valve is pushed down by the spring force of the needle valve spring 51 for the needle valve to be closed, and the injection is finished. In the succeeding lifting stroke of the plunger, fuel is sucked into the plunger chamber 25 through the fuel passage 12, poppet valve 5, and fuel passage 52.

An example of the conventional poppet valve used in an electronic controlled fuel injection apparatus for the purpose as above described is shown in FIG. 7(A) and FIG. 7(B) together with an electromagnetic valve. FIG. 7(A) shows the state in which the popped valve is opened, and FIG. 7(B) shows the state in which the poppet valve is closed. In the drawings, reference numeral 20 is an electromagnetic valve device, 3 is the pump case of a unit injector as explained above, and 52 is the fuel passage communicating to the plunger chamber of the unit injector. In the electromagnetic valve device 20, reference numerals 31 and 16 are valve cases, 031 is a solenoid housing inside the valve case 31, and 28 is a solenoid accommodated in the solenoid housing 031.

In an armature space 30, an armature 27 is fixed to the top of the poppet valve 5 by means of a bolt 29.

Reference numeral 10 is a valve seat member fixed in the pump case 3 by means of a fixing screw member 015. Reference numeral 033 is a passage hole drilled in the valve seat member 10 in the radial direction which allows an annular recess 05 of the poppet valve to communicate to an annular recess 17 of valve seat member 10. The recesses 05 and 17 are explained later. Reference numeral 5 is the poppet valve, which is fit in a through-hole of the valve seat member 10 for sliding and to the top of which is fixed the armature 27 by means of the bolt 29. Reference numeral 14 is a poppet valve spring disposed between the shoulder part of the poppet valve 5 and the ceiling part of the fixing screw member 015. The poppet valve 5 is pushed downward in the direction for the poppet valve 5 to be opened, that is, in the reverse direction of the attraction force of the armature 27. Reference numeral 05 is the annular recess formed along the periphery of the poppet valve 5, and reference numeral 17 is the annular recess formed along the periphery of the valve seat member 10. Reference numeral 12 is the supply and drain passage, one side thereof communicating to the annular recess 17 and the other side being connected to a fuel tank (not shown in the drawings). Reference numeral 10a is a seat face in the valve seat member 10 and 5a is a seat face of the poppet valve 5. The seat face 5a of the poppet valve sits on the seat face 10a of the valve seat member when closing the poppet valve. Accordingly, as the seat face 5a sits on or departs from the seat face 10a of the valve seat member 10, supply and drain passage 12 is discommunicated or communicated to the fuel passage 52 in the pump case 3. Reference numeral 07 is an axial passage communicating to an annular recess 06 formed along the inside circumference of the valve seat member 10, the axial passage 07 communicating to the fuel passage 52 which communicates to the plunger chamber of an injection pump not shown in FIG. 7(A) and FIG. 7(B). When the poppet valve 5 is closed, the fuel pressure is high in the recess 06 and low in the recess 05.

When electric current is shut off from flowing to the solenoid 28 of the electromagnetic valve device 20, the poppet valve 5 is pushed down by the spring force of the poppet valve spring 14, a gap "S" is developed between the upper surface of the armature 27 and the lower surface of the solenoid 28, the lower end face 5b of the poppet valve 5 contacts the bottom face 3a of the poppet valve device accommodating part of the pump case, the seat face 5a of the poppet valve 5 departs from the seat face 10a of the valve seat member 10, and the poppet valve is opened. Therefore, the plunger chamber 25 (see FIG. 6) is communicated to the supply and drain passage 12 through the fuel passage 52, the gap between the seat faces 5a and 10a developed by the departing of the seat face 5a from the seat face 10a, the passage hole 033 of the valve seat member 10, and the annular recess 17, and the fuel pushed down in the plunger chamber 25 as the plunger 1 (see FIG. 6) moves down is returned to the fuel tank via the fuel supply and drain pipe 12. Accordingly, fuel is not injected by the down stroke of the plunger 1.

When electric current flows to the solenoid 28 of the electromagnetic valve device 20, the armature 27 and the poppet valve 5 connected thereto are lifted up by the attraction generated in the solenoid 28 against the spring force of the valve seat spring 14 until the seat face 5a of the poppet valve 5 sits on the seat face 10a of the valve seat member 10, and the poppet valve is closed. Then the pressure rises in the plunger chamber 25 as the plunger 1 moves down, and the fuel pushed out from the plunger chamber 25 is injected from the injection holes 02a of the injection nozzle 2.

In recent years, the injection pressure is increasingly apt to be increased in order to enhance the effect of an electronic fuel injection apparatus to reduce atmospheric contaminants such as NOx and HC. The poppet valve device working in the electronic fuel injection apparatus as described above will be brought under more severe working conditions as fuel injection pressure increases.

However, with the poppet valve device of the prior art, there are problems in that cavitation erosion occurs in the poppet valve body and valve seat member due to the outburst of high-pressure fuel through the gap of the valve seat part, friction of sliding of the poppet valve body increases due to increased side thrust exerted on the poppet valve body, a crack occurs in the passage exposed to high-pressure liquid in the valve device and that bouncing occurs when the poppet valve opens, that is, when the seat face of the poppet valve body departs from the seat face of the valve seat member and the lower end face of the poppet valve contacts the bottom face of the poppet valve device accommodating part of the injection pump case.

SUMMARY OF THE INVENTION

The present invention was made in light of the problems as above described, and the object is to provide a poppet valve device with which the occurrence of a crack in the passage exposed to high-pressure liquid in the valve device, occurrence of cavitation erosion in the poppet valve body and valve seat member of the valve device, increase in sliding friction of the poppet valve body, and the occurrence of bouncing of the poppet valve body can be prevented.

To solve these problems, the present invention proposes a poppet valve device for opening and closing a high-pressure liquid passage comprising a valve seat member and a poppet valve body inserted in the through-hole of the valve seat member for sliding where the device is composed such that the seating of the seat face of the poppet valve body onto the seat face of the valve seat member separates an annular, high-pressure space from an annular, low-pressure space. The annular spaces are formed between the poppet valve body and the valve seat member. The valve seat member has an axial passage communicating to the high-pressure space and a radial passage communicating to the low-pressure space. The axial passage is formed into a plurality of passages of substantially the same diameter and length located adjacent to each other.

In the poppet valve device, the high-pressure space is not always exposed to high pressure liquid, but temporarily, and the axial passage communicating to the high-pressure space is exposed to the repetition of high pressure and low pressure. Conventionally, one axial passage has been provided in the valve seat member, and the radial thickness between the periphery of the trough-hole (hereafter referred to as the sliding surface) and the periphery of the axial passage is inevitably limited due to space limitations; when the valve device was used for high-pressure injection apparatus, the part having the limited radial thickness cracked.

By providing a plurality of axial passages having a required passage area, the stress due to high pressure in the passages is dispersed and reduced. Therefore, cracks do not occur even if the thickness between the sliding surface and the periphery of the axial passage are the same as that in the case of the conventional one axial passage. Further, as the diameter of each of the passages is reduced, the outer diameter of the annular, high-pressure space can be reduced. As a result, it is possible to design toward reducing the volume of the high-pressure space.

To reduce the volume of high pressure space means that dead volume is reduced, which results in a sharp rise of injection pressure in the case of a fuel injection apparatus, for example. That is, as the rate of rise of the pressure of the fuel compressed by the plunger is reduced less with a smaller dead volume, the injection pressure rises faster with the same plunger diameter and the same plunger velocity.

Further, in the present invention, it is preferable that the axial passage is formed into a plurality of passages of substantially same diameter and length located axially symmetrically to the center axis of the valve device.

When the valve is closed, the poppet valve body experiences even pressure around its periphery from the liquid filling the high-pressure space. When valve is opened, the liquid in the high-pressure space flows out into the low-pressure space and high-pressure liquid flows into the high-pressure space through the axial passage. When one axial passage is provided, the high-pressure liquid flow entering into the high-pressure space through the axial passage acts to push the poppet valve body, and a side thrust exerts on the sliding part of the poppet valve body and the through-hole of the valve seat member. Therefore, the resistance for the poppet valve body to slide is caused, which increases with increased liquid pressure in the axial passage. Further, the flow velocity in the annular gap between the seat faces is faster near the axial passage in the annular gap and slower at the part opposite to the axial passage. The uneven velocity distribution in the annual gap between the seat faces induces a decrease in discharge coefficient and an increase in pressure loss.

By providing a plurality of axial passages of substantially the same diameter and length located in axial symmetry, the thrusts exerted on the poppet valve body are balanced because the high-pressure liquid enters into the high-pressure space axially symmetrically, no resultant thrust exerts on the poppet valve body, and a result poppet valve body can move smoothly. Further, as a plurality of axial passages are provided, the velocity distribution of flow in the gap between the seat faces approaches a more even distribution along the annular gap, and the maximum velocity decreases with the required flow rate through the gap secured. By this, the occurrence of cavitation erosion on the poppet valve body and valve seat member can be suppressed.

In the present invention, it is preferable that the radial width of the annular gap formed between the periphery of the poppet valve body in the middle part thereof and the inside perimeter of an annular projection of the valve seat member is narrowed to restrict liquid flow from the high-pressure space to the low-pressure space so that the occurrence of cavitation erosion is suppressed.

When the poppet valve opens, the liquid in the high-pressure space bursts out rapidly to the low-pressure space and cavitation bubbles are generated. Cavitation erosion occurs on the surface of the poppet valve body and valve seat member by the liquid hammer action induced by the extinction of the bubbles.

According to the invention, as the radial width of the annular gap connecting the high-pressure space to the low-pressure space is restricted, the velocity distribution in the annual gap between the seat faces is made more uniform, resulting in a reduced maximum flow velocity when the seat face of the poppet valve body departs from the seat face of the valve seat member and liquid flows out from the high-pressure space to the low-pressure space passing through the annular gap between the seat faces; the energy of the liquid flow passing through the annular gap between the seat faces and colliding against the poppet valve body is suppressed so that the occurrence of cavitation erosion is suppressed.

Further, the present invention proposes an electronic controlled fuel injection apparatus provided with the poppet valve device, wherein a valve seat member of the poppet valve device is fixed to a valve device accommodating part so that the bottom end of the valve seat member is in close contact with the bottom face of the valve device accommodating part. The poppet valve body of the valve device is forced by an elastic member in the direction the seat face of the poppet valve body departs from the seat face of the valve seat member. The electromagnetic valve device is provided so that the poppet valve is closed when the poppet valve body is attracted by the electromagnetic valve device against the elastic force of the said elastic member to allow the seat face of the poppet valve body to sit on the seat face of the valve seat member and the poppet valve is opened when the attraction of the electromagnetic valve device is released to allow the seat face of the poppet valve body to depart from the seat face of the valve seat member. The electronic controlled fuel injection apparatus is characterized by the poppet valve device of the invention being mounted with the configuration of valve device mounting part being the same as in the prior art.

It is preferable that the poppet valve body of the valve device has a central hollow for allowing the fuel leaked from the sliding part of the poppet valve body in the through-hole of the valve seat member to escape to the poppet valve spring accommodating space. A cylindrical projection is formed on the bottom of the valve device accommodating part so that the cylindrical projection can fit in the central hollow of the poppet valve body with a small radial clearance. The impact when the lower end face of the poppet valve body collides against the bottom face of the valve device accommodating part is lessened and the occurrence of bouncing of the poppet valve body is prevented.

In an electronic fuel injection apparatus, a poppet valve device is provided for controlling fuel injection timing in the fuel supply line of the apparatus to supply fuel to the fuel injection pump of the apparatus. The timing of opening and closing of the valve device is electronically controlled by means of an electromagnetic valve device and an elastic member (usually a coil spring).

The valve is closed by lifting the poppet valve body by the attraction of the electromagnetic valve device and opened by pushing down the poppet valve body by the spring force of the poppet valve spring until the lower end face of the poppet valve body is brought into contact with the bottom face of the valve device accommodating part of the injection pump case. When the valve is closed, there is formed a clearance between the lower end face of the poppet valve body and the bottom face of the valve device accommodating part. The clearance is filled with the fuel leaked from the sliding part of the of the poppet valve body in the through-hole of the valve seat member, so the fuel in the clearance must be exhausted from there in order to allow the lower end face of the poppet valve body to come into contact with the bottom face of the valve device accommodating part.

For this purpose, an escape hole for letting out the fuel to the space where the poppet valve spring is accommodated is provided in the poppet valve body. By providing a cylindrical projection on the bottom of the valve device accommodating part to fit into the escape hole with small radial clearance to form an annular clearance of small radial width when the poppet valve body comes down, the fuel in the clearance between the lower end face of the poppet valve body and the bottom face of the valve device accommodating part must pass through the annular clearance to escape through the escape hole, by which resistance is caused for the poppet valve body to move down. The impact when the lower end face of the poppet valve body collides against the bottom of the valve device accommodating part is thus lessened.

If the height of the cylindrical projection is formed to be larger than the lift of the poppet valve body, the resistance due to fuel escape flow restriction acts during the entire period the poppet valve body moves down, and if the height is smaller than the lift of the poppet valve body, the resistance due to fuel escape flow restriction acts just before the lower end of the poppet valve body reaches the bottom of the valve device accommodating part. Thereby both good responsiveness of valve opening and lessening of the impact can be secured, where good responsiveness means that fuel injection ends sharply.

By softening the impact, valve bouncing, in which the poppet valve body collides against the bottom of the valve device accommodating part and rebounds from the bottom, is prevented. It is required to prevent bouncing because the bouncing of the poppet valve body causes pressure oscillation in the high-pressure passage between the valve device and the injection nozzle, which deteriorates the sharpness of injection end, resulting in reduced engine performance.

In the present invention, it is suitable that the poppet valve body has a cylindrical projection smaller in diameter than that of the sliding part thereof at the lower end part thereof. A cylindrical recess is provided in the bottom of the valve device accommodating part so that the cylindrical projection can fit into the cylindrical recess with a small radial clearance to form an annular gap of small radial width when the poppet valve body moves down for opening the valve until the lower end face thereof comes into contact with the bottom face of the valve device accommodating part. Thereby the impact when the lower end face of the poppet valve body collides against the bottom face of the device accommodating part is lessened and the occurrence of bouncing of the poppet valve body is prevented.

It is also preferable that the poppet valve body is provided with a throttling member to throttle fuel flow into the central hollow of the poppet valve body, whereby the impact when the lower end face of the poppet valve body collides against the bottom face of the device accommodating part is lessened and the occurrence of bouncing of the poppet valve body is prevented.

In this case, if the throttling hole of the throttling member is formed such that the upper (central hollow side) edge thereof is rounded or chamfered and the lower edge is not rounded or chamfered, the poppet valve body is easy to move upward and downward movement thereof is suppressed. Therefore, by properly rounding or chamfering the upper edge of the throttling hole, bouncing when valve closing and when valve opening can be properly controlled.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

[The First Embodiment]

Figure 1A:
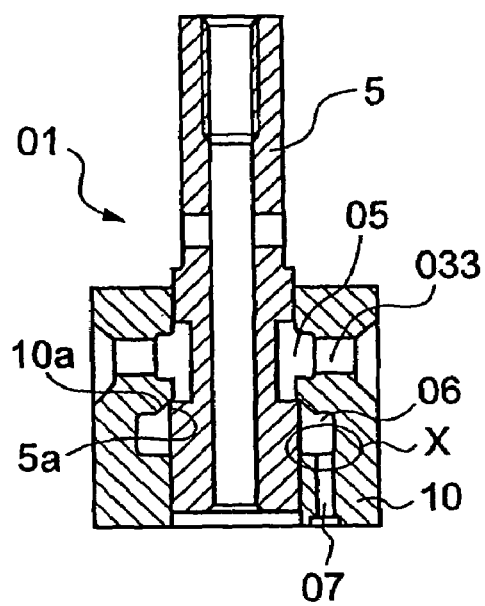
FIG. 1(A) is a sectional view of a first embodiment of a poppet valve device according to the present invention.
Figure 1B:
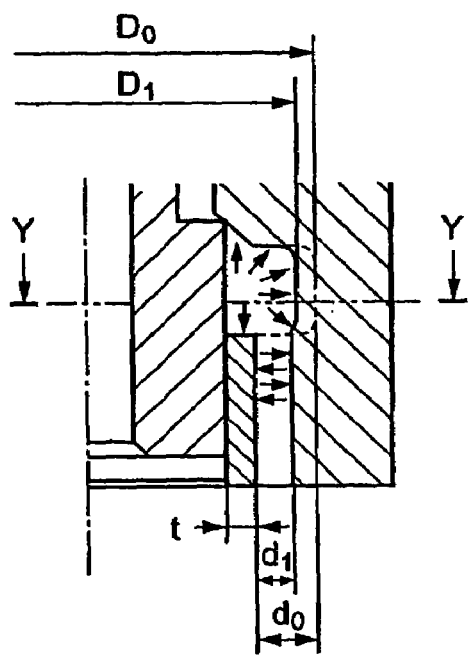
FIG. 1(B) is an enlarged detail of part X in FIG. 1A and shown in comparison with the case of the prior art.
Figure 1C:
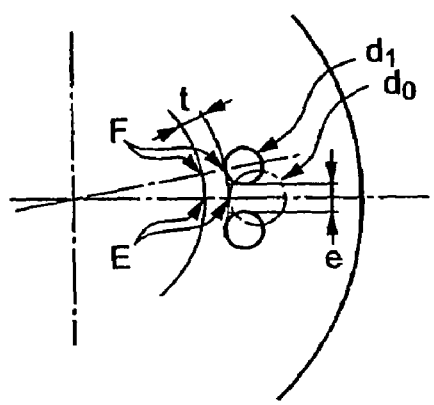
FIG. 1(C) is a section along line Y-Y in FIG. 1(B) and the case of the present invention compared with the case of prior art.

FIG. 1(A) is a sectional view of a first embodiment of the poppet valve device according to the present invention, FIG. 1(B) is an enlarged detail of part X in FIG. 1(A) and shown in comparison with the case of the prior art, and FIG. 1(C) is a section along line Y-Y in FIG. 1(B) and the case of present invention compared with the case of the prior art.

Figure 7A:
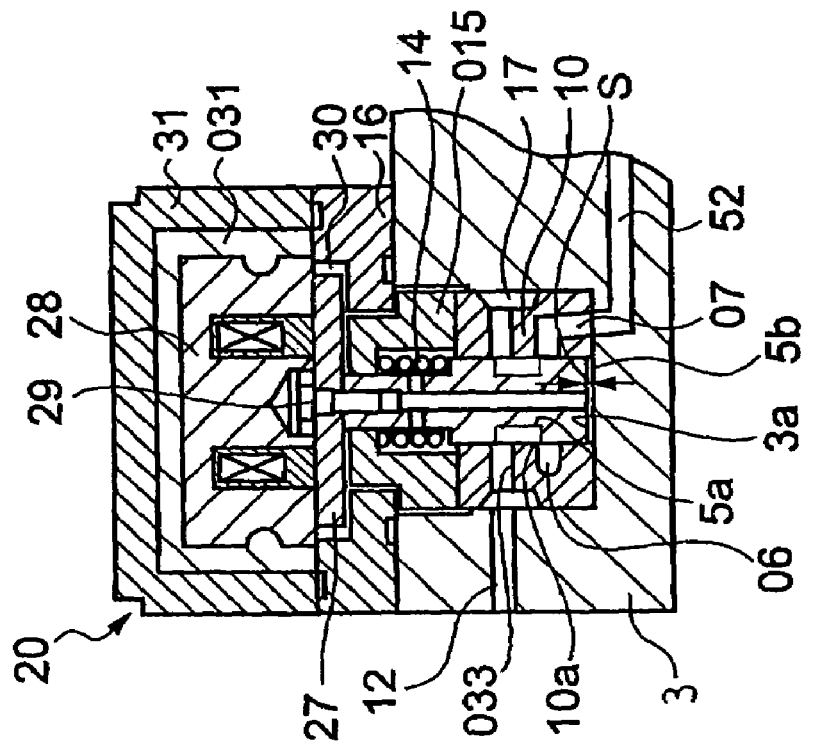
FIG. 7(A) is a sectional view of a poppet valve device of the prior art showing a state in which the valve is opened.
Figure 7B:
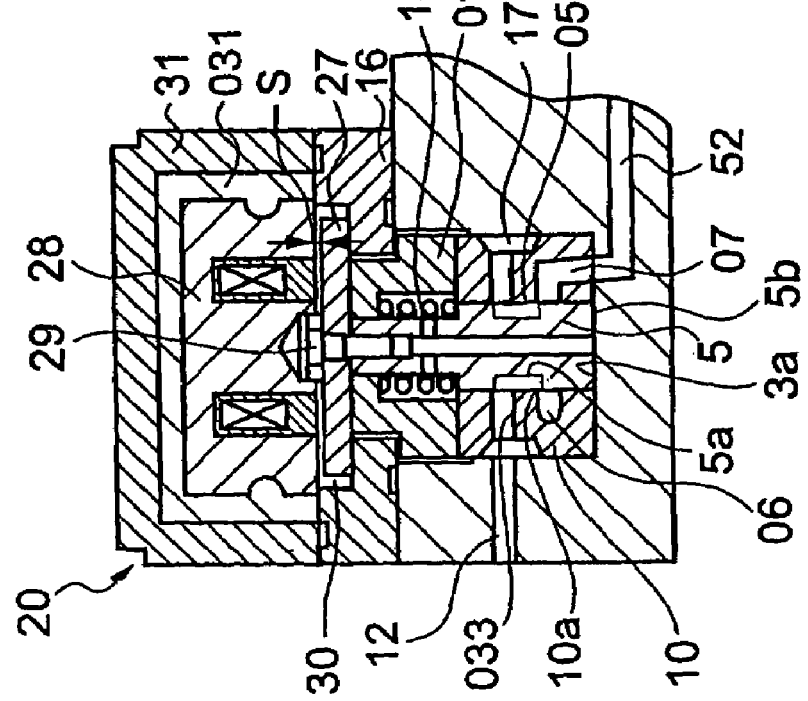
FIG. 7(B) is a sectional view of a poppet valve device of prior art showing a state in which the valve is closed.

In FIG. 1(A), a poppet valve device 01 consists of a poppet valve body 5 and valve seat member 10. Reference numeral 05 is a low-pressure space, 06 is a high-pressure space, 07 is an axial passage connecting to the high-pressure space 06, and 033 are radial passages connecting to the low-pressure space 05. These reference numerals are the same as those of the poppet valve device in FIG. 7. Arrows in FIG. 1(B) show the state that fuel pressure is creating in the high-pressure space 06.

In FIG. 1(C), a case in which the axial passage 07 consists of two passages each having diameter $d_1$ is compared with the case in which the axial passage 07 is one passage of diameter of $d_0$. The area of the two passages of diameter $d_1$ is equal to the area of the one passage of diameter of $d_0$ in the drawing. In the case of the one passage of diameter of $d_0$, a maximum tensile stress occurs at E, and a crack occurs when the fuel pressure is high in the passage. In the case of the two passages of diameter of $d_1$, the maximum tensile stress occurs at F for each passage, however the tensile stress is smaller, because the diameter of the passage is smaller.

In addition, between the two passages of diameter of $d_1$, the tensile stress at F is reduced because the circumferential deformation due to the pressure in the two passages cancel each other.

As shown in FIG. 1(B), the diameter $D_1$ of the annular high-pressure space 06 can be reduced when the diameter of the axial passage 07 is $d_1$ in comparison with the case when the diameter of the axial passage 07 is $d_0$. Therefore, the volume of the high-pressure space 06 can be reduced. In FIG. 1(B) is shown the case two axial passages are provided, however, above mentioned effect is further enhanced by reducing the diameter of the axial passage with increased number of the axial passages.

It will be appreciated that in operation, when the poppet valve body 5 moves downward to communicate the annular high-pressure space 06 with the annular low pressure space 05, a seat face of the poppet valve body unseats from valve seat face 10a of the valve seat member 10. An annular gap is formed between the valve seat face and the seat face of the poppet valve body. This annular gap is formed at an outer periphery side of the poppet valve body. In other words, there is a radial gap from the outermost peripheral surface of the poppet valve body and the valve seat face 10a (see e.g. the open position illustrated in FIG. 2). The annular gap is positioned, thus, downstream from the discharge ends of the axial passage 07 such that flow from the axial passages 07 is directed toward the annular gap.

[The Second Embodiment]

Figure 2:
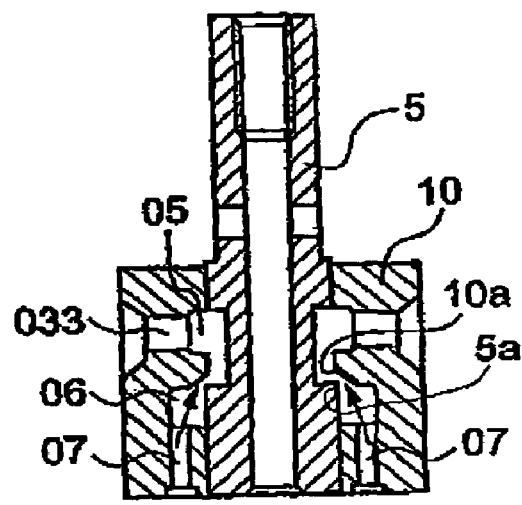
FIG. 2 is a sectional view of a second embodiment of the poppet valve device according to the present invention.

FIG. 2 is a sectional view of a second embodiment of the poppet valve device according to the present invention. In the drawing, two axial passages 07 to the right and left are provided. Other than this point, the poppet valve device of FIG. 2 is configured similar to that of FIG. 1(A), and the same reference numerals are used for components and function parts the same or similar to those of FIG. 1(A). In this case, as the high-pressure liquid flows into the high-pressure space 06 through the right and left axial passages 07 at the same time, the poppet valve body 5 experiences pressure from the high-pressure liquid flow at the same time from the right and left, and the poppet valve body 5 does not experience a side thrust as in the case of only one axial passage being provided.

Therefore, an increase of friction due to a side thrust when the poppet valve body slides in the valve seat member 10 can be prevented.

When the valve opens, the liquid in the high-pressure space 06 flows out to the low-pressure space 05, passing through the annular gap developed between the seat face 5a of the poppet valve body 5 and the seat face 10a of the valve seat member 10 as indicated by arrows in FIG. 2. Because the high-pressure liquid flows in the high-pressure space 06 through the axial passage or passages, the liquid flow into the low-pressure space tends to become strong in the part of the annular gap between the seat faces nearest to the axial passage or passages, and the velocity of the flow is largest at that part. As two right and left axial passages are provided in the case of FIG. 2, the amount of liquid flow per one passage is halved in comparison with the case where only one axial passage is provided, and the collision energy of the liquid flow impinging against the poppet valve body is dispersed into two portions.

Therefore, the occurrence of cavitation erosion is prevented or moderated. Two right and left axial passages are provided in FIG. 2, however, if a plurality of axial passages more than two are provided in axial symmetry, the effect is further enhanced.

[The Third Embodiment]

Figure 3:
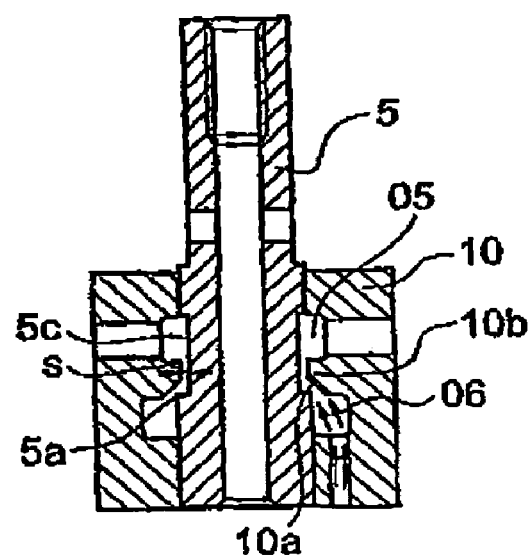
FIG. 3 is a sectional view of a third embodiment of the poppet valve device according to the present invention.

FIG. 3 is a sectional view of a third embodiment of the poppet valve device according to the present invention, and the same reference numerals are used for components and functional parts the same or similar to those of FIG. 1(A). A point different from the poppet valve device of FIG. 1(A) is that the width "s" of the annular gap between a periphery 5c of the middle part of the poppet valve body 5 and the inside perimeter of an annular projection 10b of the valve seat member 10 for forming the valve seat 10a is narrowed to throttle the liquid flow.

When the seat face 5a of the poppet valve body 5 departs from the seat 10a of the valve seat member 10 and a gap is developed between the seat faces, high-pressure liquid flows out from the high-pressure space 06 to the low-pressure space 05 passing through the gap between the seat faces and further passing through said annular gap of width "s". When the annular gap of width "s" is narrowed, the flow through the annular gap is restricted by the narrow annular gap, and the flow energy of the liquid is also restricted, so that the collision energy of the liquid flow impinging against the periphery 5c of the middle part of the poppet valve body 5 is also restricted.

Therefore, the occurrence of cavitation erosion is prevented or moderated. However, if the flow through the annular gap is excessively restricted, the velocity of pressure drop of the high-pressure fuel in the injection pump becomes slower, which results in poor sharpness of injection end. Therefore, the width "s" of the annular gap must be determined so as to be not too small.

In the poppet valve devices of the prior art, such a consideration as to provide a throttled part as mentioned above has not been made heretofore.

[The Fourth Embodiment and Its Modified Embodiments]

Figure 4A:
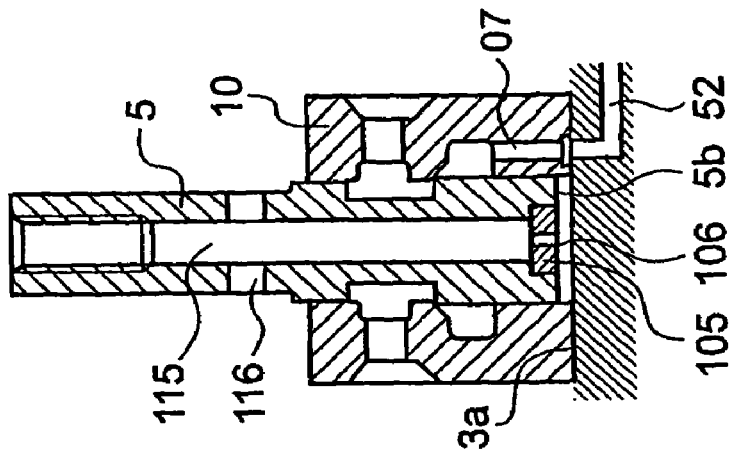
FIG. 4(A), FIG. 4(B), and FIG. 4(C) are sectional views of a fourth embodiment and modified embodiments thereof of the poppet valve device according to the present invention.
Figure 4B:
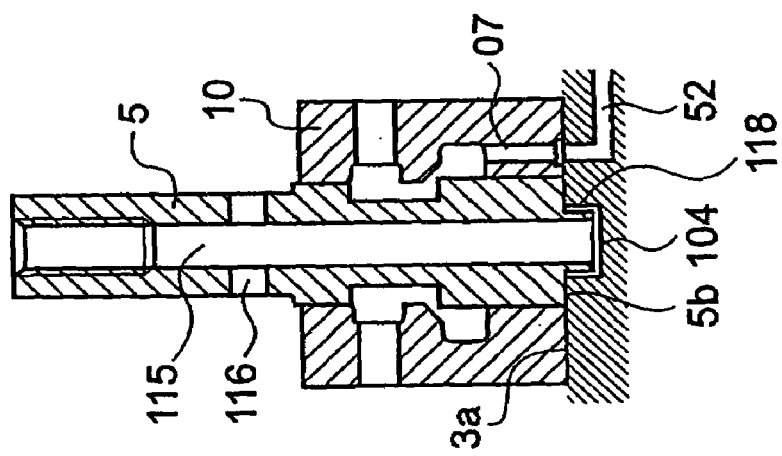
Figure 4C:
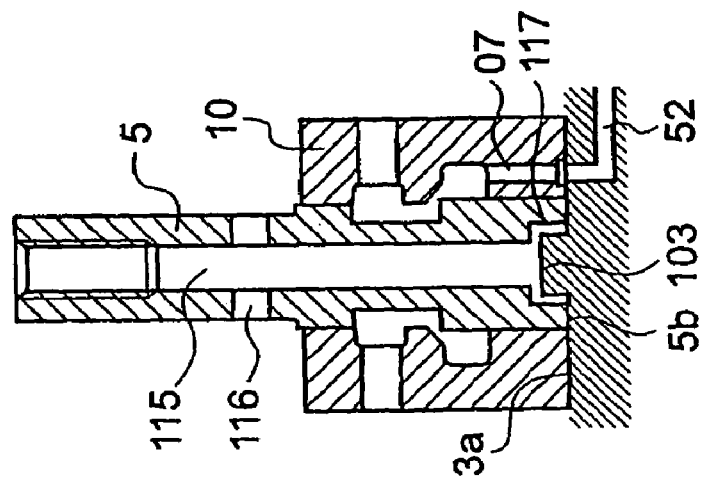

FIG. 4(A), FIG. 4(B), and FIG. 4(C) show the fourth embodiment and its modified embodiments, in which each gives a similar effect.

In FIG. 4(A) and FIG. 4(B), the poppet valve device is shown in a state in which the lower end face of the valve seat member 10 contacts the bottom 3a of the poppet valve device accommodating part of the fuel injection apparatus. In the drawings, the same reference numerals are used for components and functional parts the same as or similar to those of FIG. 1(A), and explanation is omitted. Although the lower end part of the poppet valve body 5 and shape of the bottom face 3a of the poppet valve device accommodating part is different in each of FIGS. 4(A), (B), and (C), the same reference numerals are used for convenience's sake.

Figure 5:
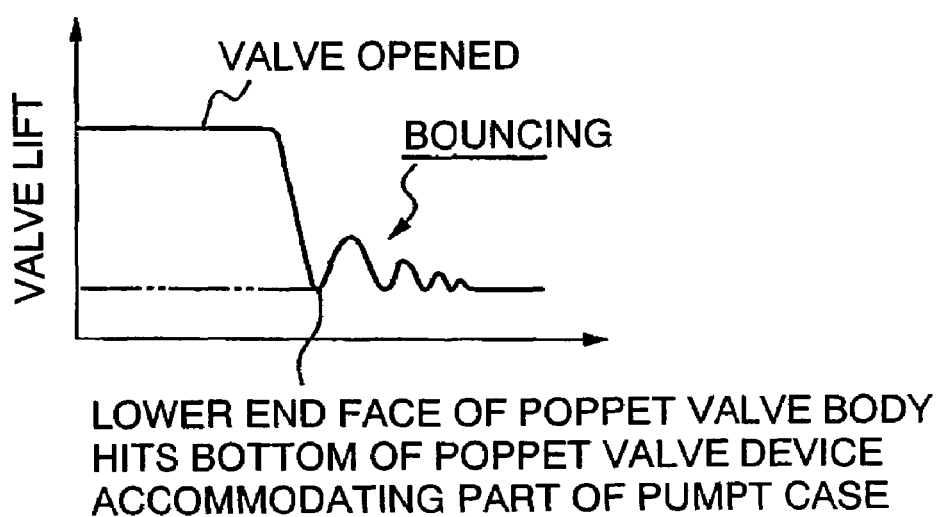
FIG. 5 is a graph showing the bouncing of the poppet valve.
Figure 6:
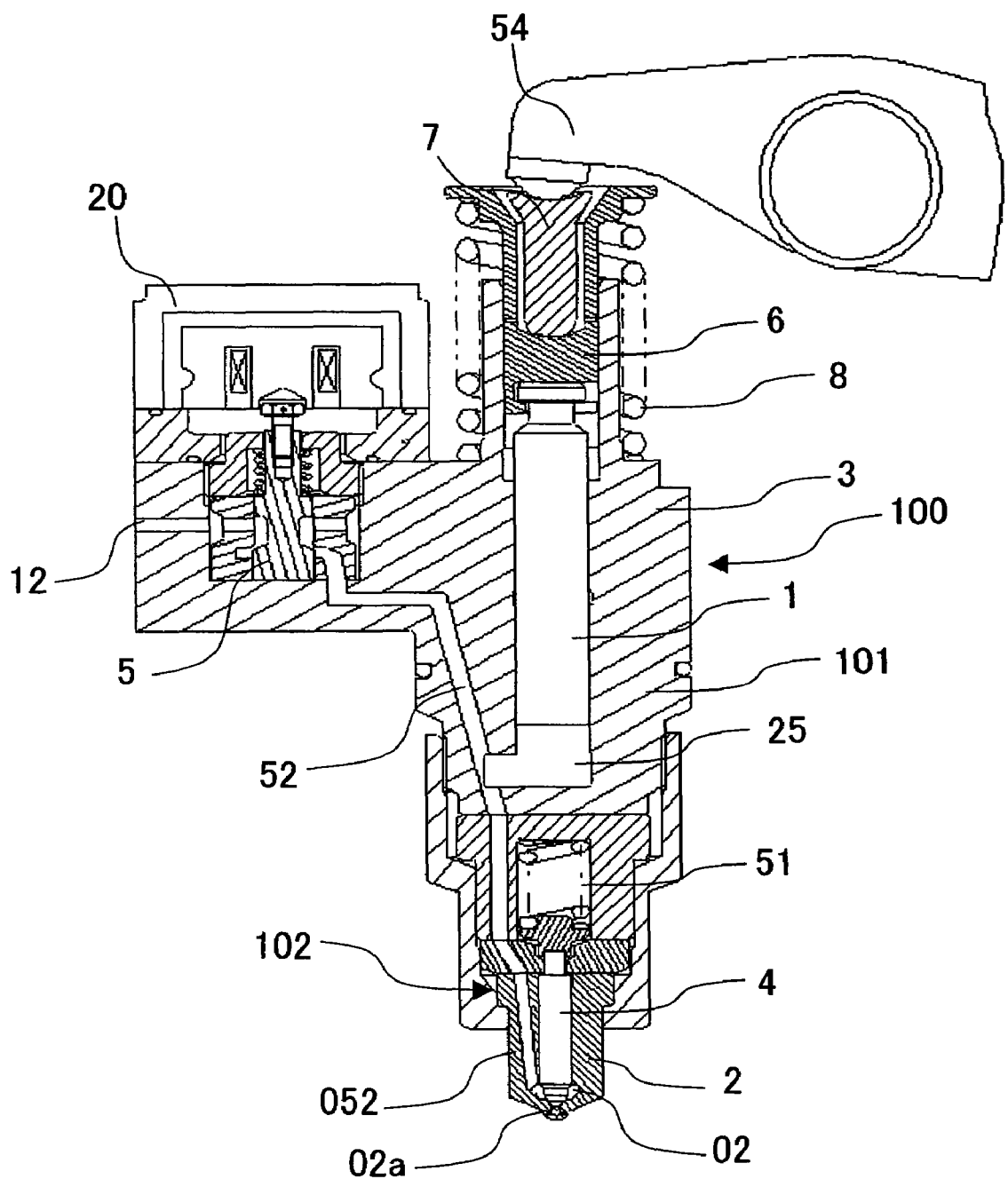
FIG. 6 is a schematic representation of a unit injector type electronic fuel injection apparatus for a diesel engine.

Generally, bouncing occurs when the poppet valve opens, that is, when the poppet valve body 5 is pushed down by the spring force until the lower end face 5b thereof impacts upon the bottom face 3a of the valve device accommodating part and then rebounds. The bouncing state is shown in FIG. 5. The embodiments of FIG. 4(A) to FIG. 4(C) are configured to prevent the occurrence of bouncing or alleviate bouncing by lessening the impact when the poppet valve body 5 hits the bottom 3a.

The poppet valve body 5 is provided with a central hollow 115 and lateral holes 116 as shown in FIG. 4(A) to FIG. 4(C) to allow the fuel between the lower end face 5b of the poppet valve body and the bottom face 3a of the valve device accommodating part to escape through them when the poppet valve body 5 moves down and collides with the bottom face 3a. In the embodiment of FIG. 4(A), a cylindrical projection 103 is formed on the bottom 3a of the valve device accommodating part and the central hollow 115 of the poppet valve body 5 is enlarged in diameter at the lower end part thereof to form an enlarged hole 117 so that the cylindrical projection 103 fits into the enlarged hole 117 with a small radial clearance to form an annular clearance of small radial width when the poppet valve body 5 moves down until the lower end face 5b comes into contact with the bottom face 3a.

Therefore, when the poppet valve body 5 moves down, the fuel between the lower end face 5b thereof and the bottom face 3a of the valve device accommodating part escapes toward the central hollow 115 passing through the narrow annular clearance.

Accordingly, there occurs resistance for the poppet valve body to move down, the descending velocity thereof is reduced, and the impact that occurs when the lower end face 5a of the poppet valve body collides with the bottom face 3a of the valve device accommodating part is lessened. The diameter of the cylindrical projection 103 and enlarged hole should be determined such that the descending velocity is not excessively reduced. The velocity which the gap between the valve seat faces increases is reduced by the reduction in the descending velocity of the poppet valve body, therefore, the energy of fuel flow through the gap between the valve seat faces is reduced, which reduces the potential for cavitation erosion.

In the embodiment of FIG. 4(B), a cylindrical recess 104 is formed in the bottom face 3a of the valve device accommodating part and a cylindrical projection 118 is provided at the lower end part of the poppet valve body 5 so that the cylindrical projection 118 fits into the cylindrical recess 104 with small radial clearance to form an annular gap of small radial width when the poppet valve body 5 moves down until the lower end face 5b contacts the bottom face 3a. The operation and effect of this embodiment are similar to those of the embodiment of FIG. 4(A).

In the embodiment of FIG. 4(C), an orifice 105 having a small hole 106 is attached to the lower end part of the central hole 115 of the poppet valve body 5, and the operation and effect of this embodiment are similar to those of the embodiment of FIG. 4(A).

As has been described in the foregoing, the poppet valve device according to the invention can prevent the occurrence of damage in a high-pressure liquid passage of the valve device, an increase in sliding friction due to the occurrence of a side thrust, the occurrence of cavitation erosion, and the occurrence of bouncing even when the valve device is applied to open and close a passage exposed to high-pressure liquid. Particularly, when the valve device is used for an electronic controlled fuel injection apparatus, an electronic controlled fuel injection apparatus superior in durability can be obtained without using material higher in grade than that used conventionally.

The invention claimed is:

1. A poppet valve device for opening and closing a high pressure liquid passage, comprising:
   a valve seat member having a through-hole and a first seat face;
   a poppet valve body slidably inserted in said through-hole of said valve seat member and having a second seat face;
   an annular high-pressure space formed between said valve seat member and said poppet valve body and an annular low-pressure space formed between said valve seat member and said poppet valve body;
   wherein seating of said first seat face onto said second seat face separates said annular high-pressure space from said annular low-pressure space;
   wherein said valve seat member has a plurality of axial passages in communication with said annular high-pressure space, said plurality of axial passages having substantially the same diameter and length and being located axially symmetrically with respect to a center axis of said poppet valve device;

wherein an annular seat gap is formed between said first seat face and said second seat face upon said first seat face unseating from said second seat face, said annular seat gap being formed at an outer periphery side of said poppet valve body and positioned downstream from discharge ends of said axial passages such that flow from said axial passages is directed toward said annular seat gap;

wherein said valve seat member has a radial passage in communication with said annular low-pressure space;

wherein said poppet valve body has a central hollow for allowing liquid to escape outside of said poppet valve body; and wherein an annular gap is formed between an outer periphery of a middle part of said poppet valve body downstream of said second seat face and an inside perimeter of an annular projection of said valve seat member downstream of said first seat face, said annular gap forming a flow passage between said annular high pressure space and said annular low pressure space, and wherein said annular projection narrows said flow passage downstream of said first seat face.

2. An electronic controlled fuel injection apparatus provided with the poppet valve device of claim 1, wherein:

said valve seat member of said poppet valve device is fixed to a valve device accommodating part so that a bottom end of said valve seat member is in close contact with a bottom face of said valve device accommodating part;

said poppet valve body is biased by an elastic member in a direction in which said seat face of said poppet valve body departs from said seat face of said valve seat member when unseating; and an electromagnetic valve device is provided such that said poppet valve device is opened when said poppet valve body is attracted by said electromagnetic valve device against the elastic force of said elastic member to allow said first seat face to seat on said second seat face and said poppet valve device is closed when attraction by said electromagnetic valve device is released to allow said first seat face to depart from said second seat face.

3. The electronic controlled fuel injection apparatus of claim 2, wherein:

said central hollow of said poppet valve body is arranged to allow fuel that has leaked from a sliding part of said poppet valve body in said through-hole of said valve seat member to escape to a space in which said elastic member is accommodated;

said poppet valve body has a central hollow; and said valve device accommodating part has a cylindrical projection formed on the bottom thereof so that said cylindrical projection can fit into said central hollow of said poppet valve body with a small radial clearance in order to reduce the impact when a lower end face of said poppet valve body collides against said bottom face of said valve device accommodating part and prevent bouncing of said poppet valve.

4. The electronic controlled fuel injection apparatus of claim 2, wherein:

said central hollow of said poppet valve body is arranged to allow fuel that has leaked from a sliding part of said poppet valve body in said through-hole of said valve seat member to escape to a space in which said elastic member is accommodated;

said poppet valve body has a cylindrical projection that is at a lower end part thereof and has a diameter smaller than that of said sliding part of said poppet valve body;

said valve device accommodating part comprises a cylindrical recess formed in the bottom thereof so that said cylindrical projection of said poppet valve body can fit into said cylindrical recess with a small radial clearance in order to reduce the impact when a lower end face of said poppet valve body collides against said bottom face of said valve device accommodating part and prevent bouncing of said poppet valve.

5. The electronic controlled fuel injection apparatus of claim 2, wherein:

said central hollow of said poppet valve body is arranged to allow fuel that has leaked from a sliding part of said poppet valve body in said through-hole of said valve seat member to escape to a space in which said elastic member is accommodated; and said poppet valve body comprises a throttling member operable to throttle liquid flow into said central hollow of said poppet valve body in order to reduce the impact when a lower end face of said poppet valve body collides against said bottom face of said valve device accommodating part and prevent bouncing of said poppet valve.

* * * * *